United States Patent [19]
Maiste et al.

[11] 3,831,356
[45] Aug. 27, 1974

[54] DRIVE MECHANISM FOR CORN HEADER GATHERING UNIT

[75] Inventors: Arved Maiste, Brantford, Ontario; Walter F. Seton, Galt, Ontario, both of Canada

[73] Assignee: White Motor Corporation of Canada Limited, Brantford, Ontario, Canada

[22] Filed: Mar. 21, 1973

[21] Appl. No.: 343,432

[30] Foreign Application Priority Data
Mar. 20, 1972  Canada .................................. 137511

[52] U.S. Cl. ........................ 56/10.3, 56/106, 56/119
[51] Int. Cl. ............................................. A01d 45/02
[58] Field of Search ............. 56/106, 111, 112, 119, 56/14.1, 14.2, 11.1, 10.3

[56] References Cited
UNITED STATES PATENTS
2,444,561  7/1948  Ferguson ............................. 56/14.2
3,271,940  9/1966  Ashton et al. ..................... 56/119 X
3,759,021  9/1973  Schreiner et al. ..................... 56/106

Primary Examiner—Louis G. Mancene
Assistant Examiner—J. N. Eskovitz
Attorney, Agent, or Firm—Lockwood, Dewey, Zickert & Alex

[57] ABSTRACT

A drive mechanism for corn header gathering unit which is housed in a gear box designed so as to serve as an integral mounting member between the gathering unit and the main frame of a combine on which the unit is adapted to be mounted. The mechanism incorporates a single power input-output shaft assembly for a multi-row gathering unit which includes bevel gear drives for stalk rolls and gathering chains and a safety clutch, with all the gear components submerged in a lubricant and the safety clutch in a separate lubricant containing compartment and with a readily removable cover plate on the gear box which provides easy access for servicing.

12 Claims, 6 Drawing Figures

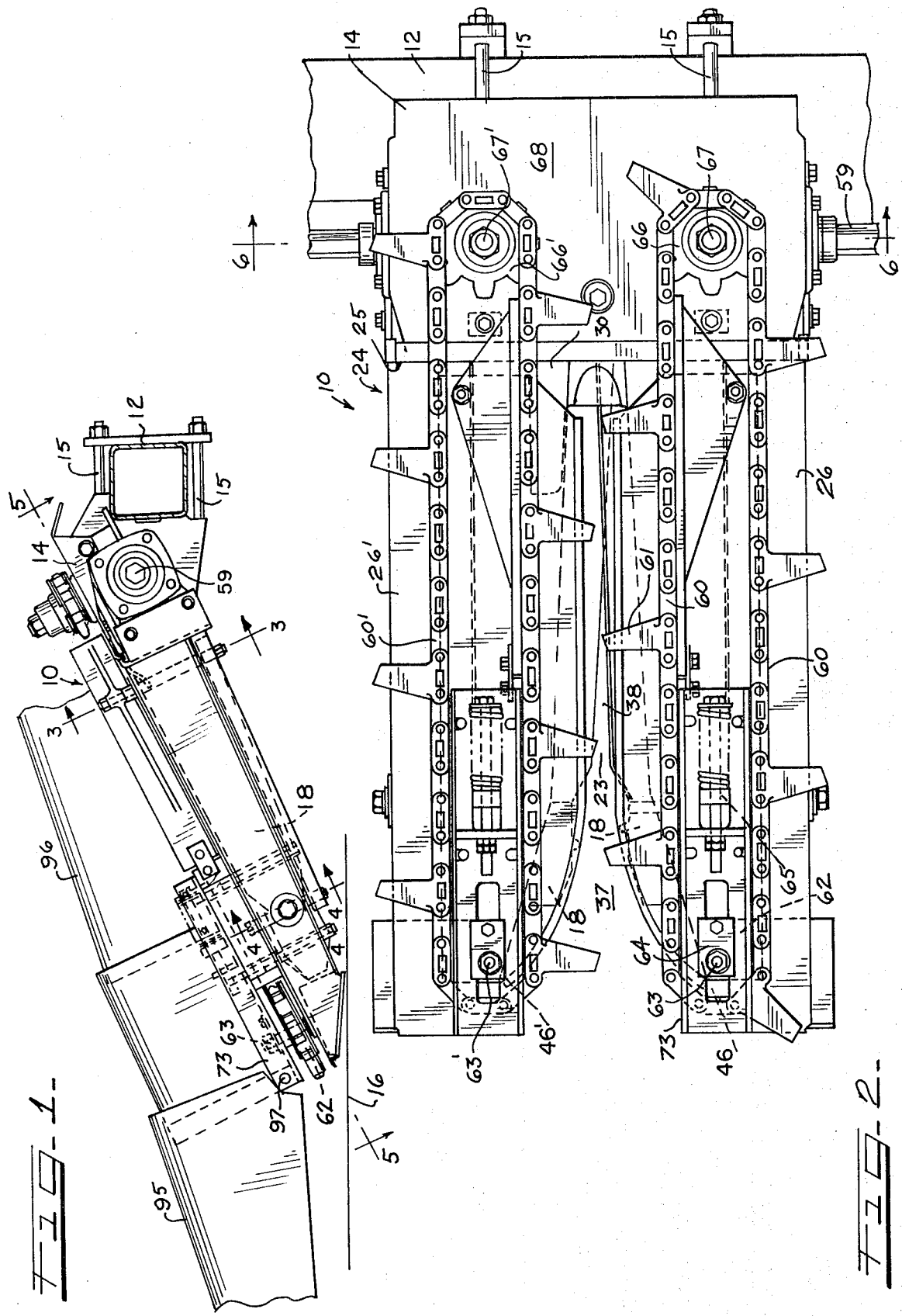

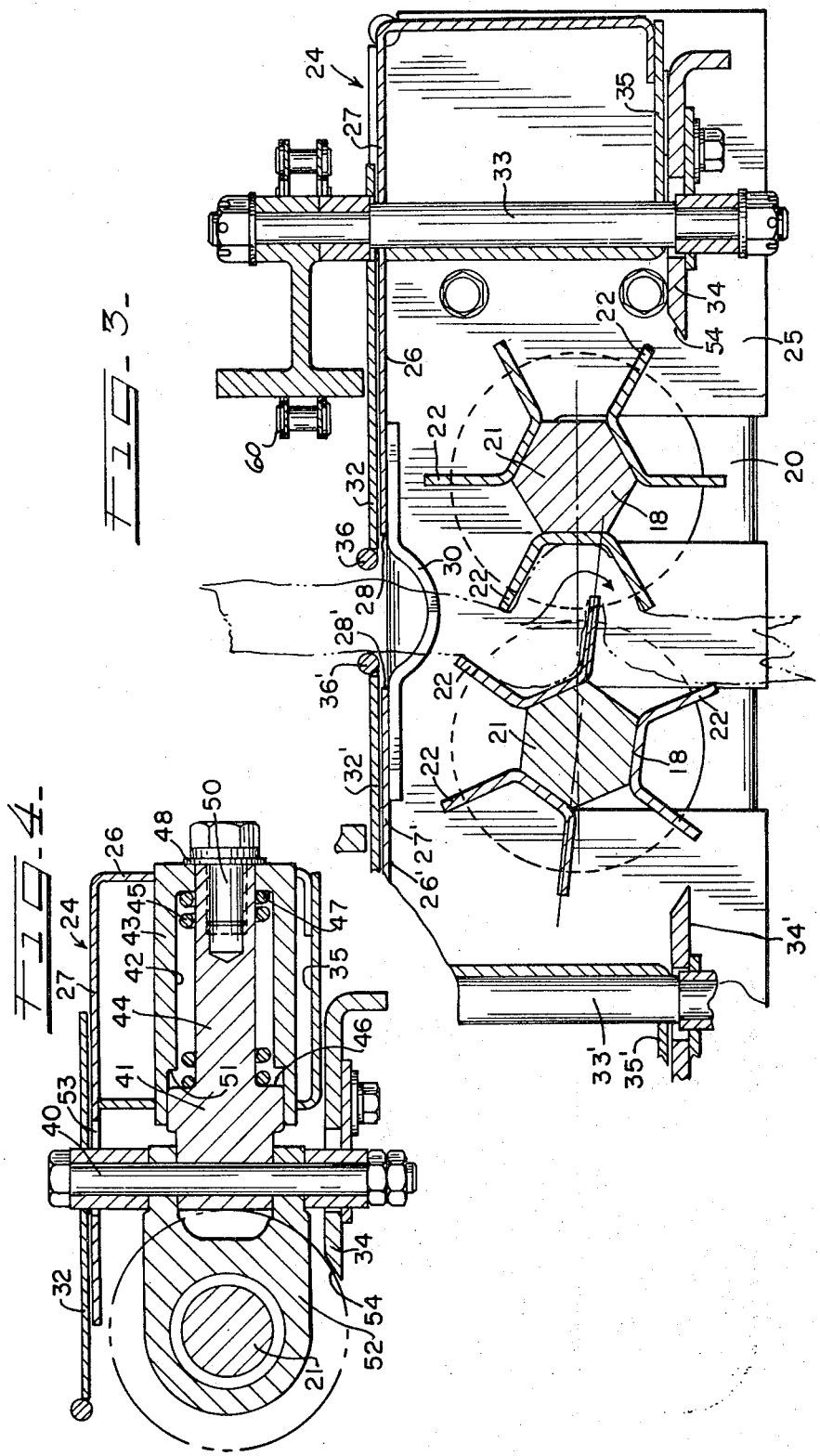

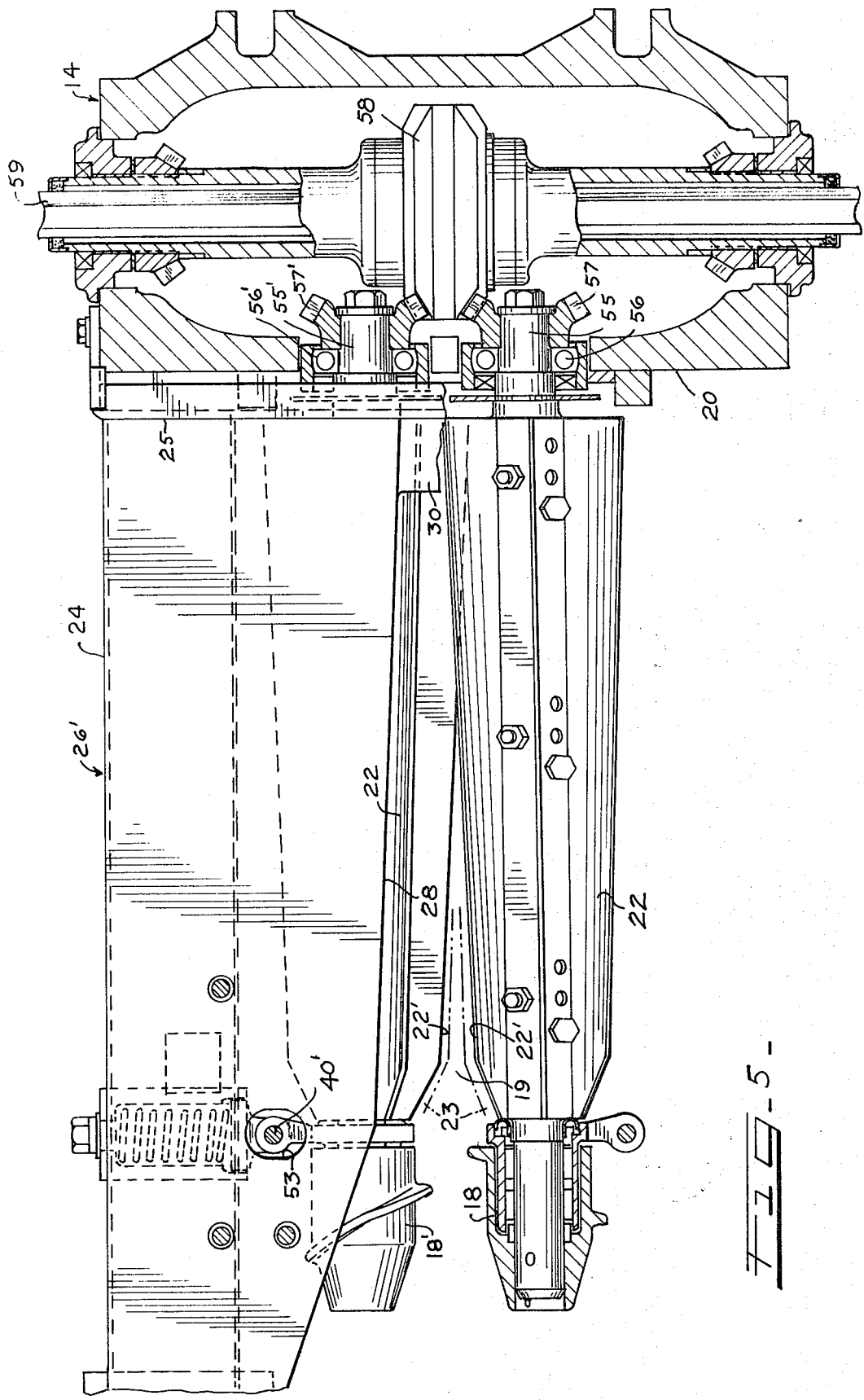

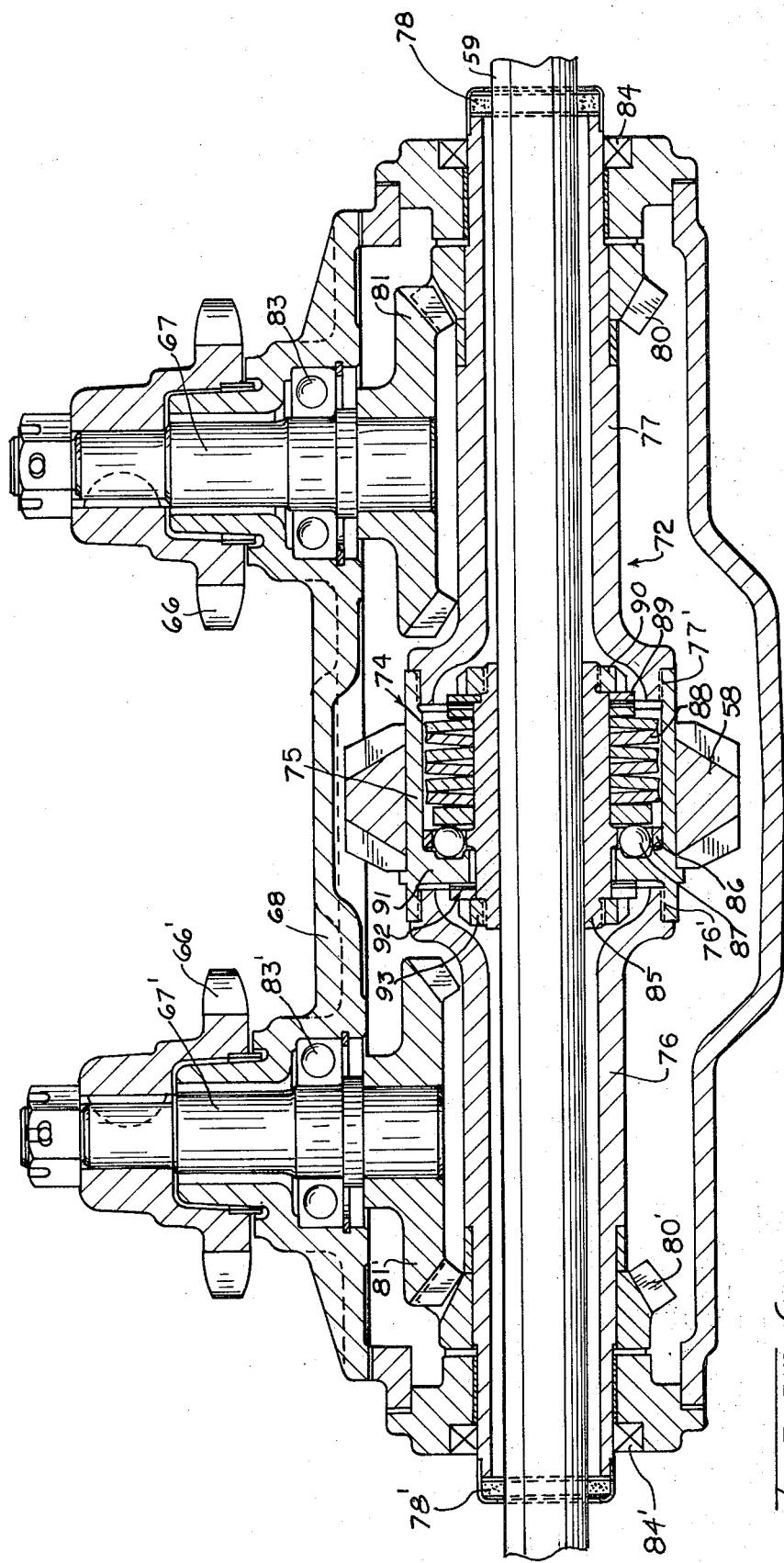
FIG-6-

DRIVE MECHANISM FOR CORN HEADER GATHERING UNIT

This invention relates to agricultural machinery and is more particularly concerned with improvements in a drive mechanism for a corn harvesting header which is adapted to be mounted on a crop harvesting combine.

Corn headers have heretofore been provided for use on crop harvesting combines which have included stalk rolls or snapper rolls arranged in pairs for row harvesting and associated gathering chains which co-operate to strip the ears of corn from the stalks and deliver the ears to the combine for further processing while ejecting the stalks. Corn headers of this character are, of course, adapted to be mounted at the forward end of the combine and provided with power drive mechanism for rotating the stalk rolls and driving the gathering chains. Generally, the drive mechanisms have involved a relatively complicated arrangement of shafting, bearings, gears and drive chains or belts for operating the header elements, with the result that high maintenance costs and excessive down time has been common. It is a general object, therefore, of the present invention to provide an improved drive mechanism for this type of equipment which operates efficiently with a minimum of maintenance and minimum loss of time in the use of the combine on which it is mounted.

It is a more specific object of the invention to provide a drive mechanism for gathering units in a corn header wherein a single power input-output shaft is mounted in a gear box housing and connected in driving relation with multi-row gathering units and wherein the gear box housing is utilized as an integral mounting member between the gathering units and the main frame of the combine on which the mechanism is mounted.

It is another object of the invention to provide a compact bevel gear box for gathering units of a harvesting combine in which there is mounted a single power input-output shaft assembly with driving connection to a pair of co-operating stalk rolls and associated gathering chains which assembly includes a center gear design for connection to the stalk rolls and an integral compact safety clutch operating to conserve space and protect all drive components from overload and damage.

A further object of the invention is to provide a drive mechanism for corn gathering units which comprises a gear box on which the gathering units are supported in cantilever fashion and having bevel gear connection with a single power input-output shaft assembly which shaft assembly includes an integral compact safety clutch protecting the drive components from overload and damage.

Another object of the invention is to provide a drive mechanism for the gathering units of a corn header which is adapted to be mounted on a harvesting combine wherein a single power input-output shaft is supported in a gear box housing which is utilized as an integral mounting member between the gathering units and the main frame of the combine and wherein the power shaft is connected in driving relation to stalk rolls and gathering chains by bevel gear drives with a clutch arrangement protecting all the drive components from overload and damage and with the gear box having a readily removable cover so as to provide access for servicing of the drive and clutch components without disassembly of the gathering unit from the main frame.

These and other objects and advantages of the invention will be apparent from a consideration of the corn harvesting header which is shown by way of illustration in the accompanying drawings wherein:

FIG. 1 is a side elevational view, with portions broken away, of a corn header which is attached to the front end of a harvesting combine and which embodies the invention;

FIG. 2 is a plan view of the apparatus shown in FIG. 1, to a larger scale, and with portions thereof omitted;

FIG. 3 is a cross sectional view taken on the line 3—3 of FIG. 1, to an enlarged scale;

FIG. 4 is a cross sectional view taken on the line 4—4 of FIG. 1, to an enlarged scale;

FIG. 5 is a sectional view taken generally on the line 5—5 of FIG. 1, to an enlarged scale and with portions broken away; and FIG. 6 is a cross sectional view taken on the line 6—6 of FIG. 2, to a larger scale.

Referring to FIGS. 1 and 2, the corn harvesting head 10 is adapted to be supported on a cross beam 12, which, in the apparatus contemplated, constitutes a part of the forward framing of a combine or which is attached to the combine so as to extend transversely of the path of travel of the combine during the harvesting operation. The corn header 10 includes, at its rearward or trailing end, a gear housing 14 in which the drive mechanism is encased. The housing 14 is secured to cross beam 12 by bolts 15 so that the entire header assembly 10 is inclined forwardly and downwardly toward a ground level which is indicated at 16.

The header assembly 10 includes a pair of stalk rolls 18 (FIGS. 2, 3 and 5) which are disposed in fore and aft relation and which extend forwardly of the housing 14 in spaced relation. The spacing between the rolls 18 is such that a path 19 (FIGS. 2 and 5) is provided for passage of the corn stalks. The stalk rolls or harvesting rolls 18 are of identical construction except for being rights and lefts. These rolls are mounted on the forward face 20 of the gear housing 14 in cantilever fashion and adapted to swing on laterally spaced, parallel axes. Each of the rolls 18 comprises a roll shaft 21 (FIG. 3) and a series of radially extending blades 22. The blades 22 are peripherally spaced and have tapered edges 22' (FIG. 5) extending longitudinally from the rear to the forward end of the rolls, the taper being such and the spacing of the roll shafts 21 being such that the blades overlap or interleave as shown in FIGS. 3 and 5 at the trailing end of shafts 21 while at the forward ends of the shafts they are traveling in spaced paths as indicated at 23. The blades 22 on the two roll shafts 21 are positioned circumferentially, by relative shaft rotation, so that they coact in gripping the stalks, that is, the edges of the blades of the respective shafts are moved out of time, by a relatively small amount or degree, so as to increase their aggressiveness by forming alternating narrow and wide gaps between the gripping edges, as illustrated in FIG. 3, which better feeds the corn stalks downwardly between the same.

A generally U-shaped support frame 24 (FIGS. 2, 3 and 4) is attached in forwardly extending relation to the cross beam 12 by means of an end plate 25 which is bolted to the forward face and the ends of the gear housing 14. The support frame 24 includes elongate box-like frame sections 26, 26' equally spaced on opposite sides of the center line of the assembly, and extending longitudinally of the assembly, or fore and aft relative to the frame end plate 25. Each of the box-like frame sections 26, 26' has a top plate 27, 27' with the inner, confronting edges 28, 28' tapered outwardly, in diverging relation in the direction of the free ends thereof so as to afford a gradually restricted passage or path for the corn stalks leading to a bridgeforming plate member 30 adjacent the end plate 25. The frame sections 26, 26' provide a support or mounting frame for stripper plates 32, 32' (FIGS. 2, 3 and 4) which are mounted on the hinge pins 33, 33' and which are disposed immediately above the top frame plates 27, 27'. The frame sections 26, 26' support also trash knives 34, 34' which are mounted below the bottom frame plates 35, 35'. The stripper plates 32, 32' extend fore and aft with the major portion of their confronting edges 36, 36' generally parallel while at their free ends, the edges 36, 36' curve away from each other so as to provide an entrance throat 37 (FIG. 2) and a restricted passage 38 for the corn stalks which terminates at the bridge plate 30.

The roll shafts 21 and the associated stripper plates 32, 32' and trash knives 34, 34' constitute separate assemblies which are supported at the forward or leading ends of the members on vertically disposed anchor pins 40, 40' (FIG. 4). The supporting arrangement is the same for each of these assemblies and only one is described in detail. The vertically disposed anchor pin 40 is mounted for limited lateral movement in the free end of the associated frame section 26. The pin 40 is mounted on the inner end of a transversely extending plunger or slide member 41 which is mounted in the bore 42 of a cylindrical support member 43, the latter being in turn mounted in the frame section 26. The slide member 41 has a stem forming portion 44 of reduced cross section on which there is received a compression spring 45 with one end seated against the shoulder 46 and the other end seated against the internal flange 47 in the bore 42. A pre-set stop member 48 is secured on the outer end of the slide 41 by means of a stud 50 and normally bears on the outer face of the guide sleeve 43 so as to limit the inward movement of the carriage forming slide member 41. Shoulder 51 in the bore 42 limits the outward movement of the slide member 41. The roll shaft 21 is attached to the anchor pin 40 by a bracket member 52 while the stripper plate 32 and the trash knife 34 are attached to the top and bottom ends of the pin 40. The top frame plate 27 is slotted at 53 to accommodate the movement of the pin 40. The trash knife 34 is adjustably connected to the pin 40 so as to enable the inner edge 54 to be positioned close to the path of the blades 22 on the roll shaft 21 as shown in FIG. 4.

The roll shafts 21 (FIG. 5) are mounted at their rear ends for swinging movement in an identical manner on the front wall 20 of the gear housing 14. The roll shafts 21 are supported at their trailing or rear ends 55 by spherical bearing assemblies 56 which are mounted in spaced relation in the housing wall 20 so as to permit limited pivoting or swinging movement of the rolls 18 in a lateral direction on vertical axes. A bevel gear 57 is carried on each shaft end 55 and meshes with a common drive gear 58 which is connected to an input power drive shaft 59.

The frame section 26 supports on its top face a gathering chain 60 (FIG. 2) on which there are spaced stalk engaging lugs 61 extending outwardly in the plane of the chain. The chain 60 travels on a sprocket 62 on an upstanding shaft 63 which is mounted in a slidable support bracket or bearing member 64 with an associated tensioning assembly 65 of conventional construction. At the opposite end of the frame section 26 the chain 60 is mounted on a drive sprocket 66 supported on an upstanding shaft 67 which is journaled in the removable top plate 68 of the gear box housing 14 and connected in driving relation with the input power shaft 59. A co-operating gathering chain 60' is supported on the frame section 26' and mounted at the trailing end on a drive sprocket 66' supported on the upstanding shaft 67' which is journaled in the gear box top plate 68 and connected in driving relation with the power shaft 59.

The gear 58 for driving the rolls 18 is mounted on a tubular output shaft assembly 72 (FIG. 6) which is in turn mounted on the hexagonal power input shaft 59. The power shaft 59 is connected in driving relation with the tubular output shaft assembly 72, through which it extends, by means of a safety clutch assembly 74 which is housed within the center drive gear 58 and forms an integral part of the latter. The gear 58 is mounted on the outer tubular member 75 of the safety clutch 74 which member 75 is normally driven upon rotation of the input power shaft 59. The tubular outer clutch member 75 has driving connections with right and left hand tubular sections 76 and 77 of the output shaft assembly 72, the drive connections being indicated at 76' and 77'. Thus the clutch member 75 forms a connecting section for the tubular shaft sections 76 and 77. Suitable seal assemblies 78 and 78' are provided at the outer ends of the shaft sections 76, 77 which enable the operating elements of the clutch assembly 74 to be submerged in a special clutch lubricant and sealed to exclude foreign materials, dust and moisture so as to provide maximum life of clutch components.

The tubular shaft sections 76 and 77 (FIGS. 3, 4 and 6) of the output shaft assembly 72 carry at their respective outer ends gears 80 and 80' which are in driving engagement with bevel gears 81 and 81' on the lower ends of vertically disposed drive shafts 67 and 67' for the gathering chains 60 and 60'. The drive shafts 67 and 67' are mounted in suitable bearings 83 and 83' in the removable top cover plate 68 on the housing 14. Some adjustment axially of the shaft assembly 72 is provided for the gears 80 and 80' so as to permit variations in the spacing of the gathering chains 60 and 60'. The gear box or housing 14 is provided in opposite ends with suitable bearing and seal assemblies 84 and 84' which prevent the passage of fluid along the shaft members 76 and 77. The readily removable cover plate member 68 is provided with suitable sealing gaskets and the shafts 67 and 67' are provided with suitable sealing means. The gear box 14 may thus provide a sealed compartment which may be filled with a suitable lubricant permitting the entire drive mechanism to be submerged in the lubricant.

The safety clutch assembly 74 in the form illustrated in FIG. 6 comprises a hub member 85 which is slidably mounted and axially adjustable on the hexagonal power input shaft 59. The hub member 85 has an outwardly directed radial flange 86 with spaced apertures in which ball members 87 are held by pressure of Bellville springs 88 bearing at the end of the hub on a needle bearing and thrust race assembly 89, the latter held thereon by nut 90. The ball members 87 normally seat in co-operating spaced pockets or sockets in an inwardly extending radial flange 91 on the outer sleeve forming drive member 75, the flange 91 bearing against a thrust plate assembly 92 which is held on the hub end by nut 93. The entire assembly 74 will rotate with the input shaft 59 under normal load. When the load exceeds a predetermined value the Bellville springs 88 will be compressed and the ball members 87 will ride up out of the sockets in the flange 91 thus breaking the driving connection between the hub member 85 and the outer drive member 75.

At the forward end or entrance end of the frame section 26 a shroud 95 of tapered configuration is mounted and extends from the end of a top cover or shield assembly 96. The cover 96 is pivoted at 97 on a portion of the bracket 98 on which the chain tensioning device 65 is mounted and extends over the frame section 26. The cover member 96 may be swung about the pivot 97 to provide access to the gathering chain 60 and roll 20. A like cover or shroud arrangement is provided on the frame section 26.

In describing the anchor pins 40, 40' and the pivot axes at the rear ends of the roll shafts 21 and the chain drive shafts 67, 67' as vertically disposed or vertical it will be understood that these elements are not truly vertical but they are upright or upstanding and, in normal operating position as shown in FIG. 1, they will be inclined forwardly relative to a truly vertical plane.

While a single header unit or assembly 10 is illustrated, which is designed for harvesting a single row of corn, it will be understood that in normal operations more than one such unit or assembly 10 will be employed. By loosening the bolts 15 the position of the assembly 10 may be adjusted along the support beam 12. The support beam 12 in the normal combine, will have a length sufficient to support at least three of the header units 10. The input power shaft 59 will be of sufficient length to accommodate the number of header units employed, with the gear box 14 and the enclosed drive assemblies being slidable on the power shaft 59 so as to permit adjustment of the units 10 axially on the shaft 59.

We claim:

1. A power driving mechanism for corn gathering units which are adapted to be mounted on a cross member on the forward end of a harvesting combine which mechanism comprises an elongate gear box having corn harvesting rolls and associated gathering chains mounted thereon and extending in a fore and aft direction from the front wall thereof, a power input output shaft assembly mounted in said gear box and including an input power shaft extending through opposite ends of said elongate gear box, a gear train connecting said power input-output shaft assembly in driving relation with each harvesting roll, a gear train connecting said power input-output shaft assembly in driving relation with each said gathering chain and an overload safety clutch interposed between said power input-output shaft assembly and said gear trains, each of said gear trains including a drive gear coaxially mounted in spaced relation on said power input-output shaft assembly.

2. A power driving mechanism as set forth in claim 1 wherein said elongate gear box and contents is adjustable along the axis of said drive shaft.

3. A power driving mechanism as set forth in claim 1 wherein said gear box has a readily removable cover member providing access to said gear trains and means enabling said gear trains to be immersed in a lubricant.

4. A power drive mechanism as set forth in claim 1 wherein said input-output shaft assembly comprises a sectionalized tubular output shaft assembly into which said input power shaft coaxially extends with the sections thereof driven by a safety clutch forming an integral part of a common gear train for driving a pair of the corn harvesting rolls.

5. A power drive mechanism as set forth in claim 4 wherein each said output shaft section has a separate driving connection with said safety clutch.

6. A power drive mechanism as set forth in claim 1 wherein said input-output shaft assembly comprises said input power shaft extending coaxially into a sectionalized tubular output shaft assembly which is connected to said input shaft by a safety clutch with each section of the output shaft having a separate driving connection with said safety clutch.

7. A power driving mechanism for multi-row corn gathering units which are adapted to be shiftably mounted on the forward end of a harvesting combine which mechanism comprises an elongate gear box having means for mounting on a forward portion of the frame of said combine, corn harvesting rolls mounted on said gear box and extending forwardly thereof in cantilever fashion, a power shaft assembly including an input shaft and an output shaft assembly coaxially mounted in said gear box with said input shaft extending through opposite ends thereof, a gear train connecting the output shaft assembly with each harvesting roll, and an overload safety clutch incorporated in said power shaft assembly and forming a drive connection between said input shaft and said output shaft assembly, said gear train including a gear surrounding said clutch.

8. A power driving mechanism as set forth in claim 7 wherein said elongate gear box and contents are shiftable along said input shaft.

9. A power driving mechanism as set forth in claim 7 wherein the input shaft of said power shaft assembly and the output shaft assembly are in telescoping relation.

10. A power driving mechanism as set forth in claim 7 wherein said output shaft assembly includes a gear having driving connection with a pair of said corn harvesting rolls.

11. A power driving mechanism as set forth in claim 7 wherein said power shaft assembly comprises a single input shaft and an output shaft assembly telescoped thereon with a drive gear having a driving connection with a pair of corn harvesting rolls and separate drive gears having driving connection with gathering chains which are associated with the respective corn harvesting rolls.

12. A power driving mechanism as set forth in claim 7 wherein said gear box has a removable top cover member and wherein said input shaft extends in telescoped relation within said output shaft assembly and said power shaft assembly is mounted in said gear box so that the assembly may be immersed in a lubricant in the gear box while the input shaft and associated safety clutch may be immersed in a lubricant within the output shaft assembly independently of the lubricant in the gear box.

* * * * *